US006659699B2

United States Patent
Stoewer et al.

(10) Patent No.: US 6,659,699 B2
(45) Date of Patent: Dec. 9, 2003

(54) LOCKBOLT FOR FORMING A MECHANICALLY SECURED AND SEALANT SEALED CONNECTION BETWEEN COMPONENTS

(75) Inventors: Udo-Henning Stoewer, Bremen (DE); Gerhard Turlach, Osterode (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/081,878

(22) Filed: Feb. 20, 2002

(65) Prior Publication Data

US 2002/0114680 A1 Aug. 22, 2002

(30) Foreign Application Priority Data

Feb. 20, 2001 (DE) .......................... 101 07 952

(51) Int. Cl.[7] .................. F16B 19/00; F16B 39/02
(52) U.S. Cl. .................. 411/361; 411/43; 411/82; 411/421
(58) Field of Search .................. 411/310, 311, 411/361, 45, 43, 418, 420, 421, 451.1, 82

(56) References Cited

U.S. PATENT DOCUMENTS

| | | | | |
|---|---|---|---|---|
| 2,232,336 A | * | 2/1941 | Meersteiner | 411/421 |
| 2,314,898 A | * | 3/1943 | Purinton | 411/421 X |
| 2,484,644 A | * | 10/1949 | Poupitch | 411/311 |
| 2,562,516 A | * | 7/1951 | Williams | 411/421 X |
| 3,371,572 A | * | 3/1968 | King, Jr. | 411/361 |
| 3,459,447 A | * | 8/1969 | Hurd et al. | 411/339 X |
| 3,464,472 A | | 9/1969 | Reynolds | |

FOREIGN PATENT DOCUMENTS

| | | | | |
|---|---|---|---|---|
| DE | 19712180 | | 9/1998 | |
| EP | 0955477 | | 11/1999 | |
| GB | 913759 | * | 12/1962 | 411/45 |
| SU | 1567808 | * | 5/1990 | 411/361 |

* cited by examiner

*Primary Examiner*—Neill Wilson
(74) *Attorney, Agent, or Firm*—W. F. Fasse; W. G. Fasse

(57) ABSTRACT

A lockbolt includes a bolt head, a shank, a locking portion, a predetermined breaking point, and a break-away portion. The locking portion includes a knurled surface having knurling peaks between intersecting knurling grooves that extend in a direction with an axial component, e.g. spiraling helically. A sealant on two workpieces smears onto the knurled surface when the bolt is inserted in a hole therein, but does not need to be removed. A locking collar is swaged onto the locking portion to secure the workpieces between the head and the collar. The sealant is distributed as a thin layer to provide a seal and an adhesive bond between the collar and the knurled surface. Excess sealant is squeezed-out axially, without forming encapsulated pressurized sealant pockets and without hindering the swaged engagement of the locking collar onto the knurling. Then the break-away portion is broken-off at the breaking point.

20 Claims, 4 Drawing Sheets

LOCKBOLT FOR FORMING A MECHANICALLY SECURED AND SEALANT SEALED CONNECTION BETWEEN COMPONENTS

PRIORITY CLAIM

This application is based on and claims the priority under 35 U.S.C. §119 of German Patent Application 101 07 952.4, filed on Feb. 20, 2001, the entire disclosure of which is incorporated herein by reference.

1. Field of the Invention

The invention relates to a lockbolt with a locking collar such as a swageable collar for mechanically securing two or more components, i.e. workpieces, through a hole that has been sealed with a sealant.

2. Background Information

It is generally known to use lockbolts for forming high-strength mechanical joints of two or more workpieces, for example in the field of aircraft manufacturing. The lockbolt is secured in aligned holes through the workpieces, which have been sealed or provided with a sealant. The lockbolt includes a shaft that extends through the holes in the workpieces, and a bolt head at one end of the shaft, whereby the head lies against the outer surface of one of the workpieces. The other end of the shaft that protrudes out of the opposite side of the other workpiece includes a profiled locking portion, onto which is secured a lock ring or collar, such as a swageable collar for establishing a secure force-locking and force-transmitting connection. The lockbolt further includes a break-away portion or pintail portion that is connected to the locking portion by a predetermined breaking point or so-called break-pin area, for example in the manner of a frangible neck. This break-away portion can be gripped with an appropriate tool, such as a tension-applying tool for forming the mechanically secure connection and then breaking off the break-away portion.

A lockbolt of the above described general type is disclosed, for example, in published European Patent Application EP 0,955,477. The lockbolt according to this publication has the following structure with the following components. The lockbolt includes a shaft comprising a shank for penetrating through and closely fitting into the bored holes in the components or workpieces that are to be connected. The bolt further includes a bolt head for preventing axial movement of the lockbolt within the bored holes in the workpieces. A locking portion or region of the shaft includes plural circumferentially extending annular grooves, which are engaged by a swageable locking collar for establishing a mechanical connection of the lockbolt with the workpieces. A pintail or break-away portion is connected to the end of the locking portion by a break-pin area or frangible neck, which is particularly located between the above-mentioned circumferential annular grooves of the locking portion and the pintail. When the locking collar is swaged and coupled onto the grooves of the locking portion, the pintail is released from the shank by breaking the break-pin area.

Especially according to the above mentioned EP 0,955,477, an O-ring is arranged on the break-pin area or on the pintail, i.e. generally between the locking collar and the free end of the bolt opposite the bolt head. The outer diameter of the O-ring is larger than the diameter of the shank, so that as the lockbolt, with the O-ring thereon, is inserted into the bored hole in the workpieces, the O-ring will wipe any excess undesired sealant within the bored hole and prevent this sealant from reaching and filling into the annular circumferential locking grooves. The sealant is supposed to stay on the portion of the lockbolt between the O-ring and the free end of the bolt, i.e. on the break-away pintail, without contaminating the grooves of the locking portion of the bolt.

The known arrangement of a lockbolt with a sealant-wiping O-ring is intended to prevent the undesired accumulation of sealant from the bore hole of the workpieces into the locking grooves of the bolt. Such sealant would otherwise have to be manually removed from the grooves before the locking collar can be swaged and engaged thereon. If sealant remains in the grooves when the locking collar is to be swaged thereon, then the sealant becomes trapped and encapsulated by the locking collar within these closed and continuous circumferential grooves, and therefore forms a pressurized hydraulic buffer, which prevents the proper complete swaging engagement of the locking collar into the locking grooves of the bolt.

In actual practice, while the O-ring wipes some sealant out of the bored hole of the workpieces and thus ahead of and away from the locking grooves of the bolt, some sealant nevertheless still reaches and contaminates the annular circumferential grooves. Thus the proper functionality of the mechanical swaged connection cannot be reliably and completely ensured in the event of a remaining contamination of the parts of the bolts. This is especially problematic due to the annular circumferential configuration of the locking grooves of the locking portion of the known bolts. Whenever sealant or other contaminant is present in such circumferential annular grooves, the sealant or contaminant becomes sealed and encapsulated in this closed groove by the locking collar being swaged onto the locking portion of the bolt. The sealant or contaminant thus forms a pressurized hydraulic buffer between the locking portion of the bolt and the locking collar. As a result, the locking collar cannot be properly and completely swaged onto the locking portion of the bolt shank, so that an adequate mechanical holding power cannot be achieved. Moreover, a further disadvantage is that the O-rings must be individually installed on the individual lockbolts, and after the bolt-securing process, the O-rings must be tediously removed, if they have not fallen away by themselves.

SUMMARY OF THE INVENTION

In view of the above, it is an object of the invention to provide a lockbolt of the above described general type, which is improved in such a manner so as to achieve a sufficient functional security even when the functional area between the locking portion of the bolt and the locking collar is contaminated with sealant. Another object of the invention is to simplify the work necessary for securely installing and fastening such a lockbolt. The invention further aims to avoid or overcome the disadvantages of the prior art, and to achieve additional advantages, as apparent from the present specification.

The above objects have been achieved according to the invention in a lockbolt having a bolt shaft and a bolt head at one end of the bolt shaft. The bolt shaft includes a locking portion, and a break-away portion connected to the locking portion through a predetermined breaking point. The bolt itself is arranged further in combination with a locking collar that is mechanically secured, e.g. crimped or swaged, onto the locking portion of the bolt shaft. The circumferential or generally cylindrical surface of the locking portion of the bolt shaft is provided with a knurling thereon, especially in the manner of a so-called brilliant or diamond-patterned functional area. The knurling may, for example, include an intersecting or criss-crossing pattern of spiral grooves that respectively spiral in two opposite directions around the locking portion of the bolt shaft, and form therebetween a plurality of diamond-shaped knurling peaks bounded by sloping, knurling flanks. This knurling pattern or surface configuration can be cut, pressed, molded, cast, embossed, or otherwise formed on the surface of the locking portion of the bolt shaft. Preferably, the knurling grooves extend at an angle, i.e. in a spiral configuration, from one axial end to the other of the locking portion. A sealant is provided between the knurled surface of the locking portion and the locking collar.

The knurling of the locking portion of the bolt shaft provides the necessary mechanical gripping and locking structures onto which the locking collar is deformed, i.e. crimped or swaged, in order to establish a secure mechanical connection of the locking collar onto the locking portion of the bolt shaft, and thereby to securely mechanically join the workpieces between the bolt head and the locking collar, with the bolt shaft extending through aligning holes provided in the workpieces.

Moreover, the knurling allows the sealant between the locking collar and the knurled surface of the locking portion of the bolt shaft to be distributed, and any excessive sealant to be squeezed-out, as follows. When the shaft of the locking bolt is inserted through the aligned holes of the workpieces, which have been sealed with a sealant, the sealant becomes smeared or wiped onto the shaft of the bolt, including the locking portion thereof. When the locking collar is deformed and locked onto the knurled surface of the locking portion of the bolt shaft, the knurling grooves allow the sealant to become uniformly spread out to form a thin surfacial sealant layer or film over the knurled surface, i.e. between the knurling and the inner surface of the locking collar being deformed onto the knurling. Thereby, this thin sealant layer provides an additional sealing and adhesive function without hindering the mechanical swaging or deforming interconnection of the locking collar onto the knurled surface of the locking portion of the bolt shaft.

According to further details of embodiments of the invention, the predetermined breaking point or frangible neck is formed by a circumferentially extending annular groove between the locking portion and the break-away portion of the shaft. Also, the break-away portion preferably comprises a plurality of parallel circumferentially extending grooves thereon, which allow a tool such as a tensioning tool or clamping, squeezing and upsetting tool to be mechanically secured thereon.

A significant advantage of the invention is that the knurling provided on the surface of the locking portion of the bolt shaft effectively prevents the formation of encapsulated chambers, and instead provides venting and sealant-escape-paths between the locking portion and the locking collar, as the locking collar is deformed or swaged onto the locking portion of the bolt shaft. Particularly, the knurling grooves provide an outlet for the excess sealant to escape or be squeezed-out from between the locking collar and the locking portion of the bolt shaft along these knurling grooves, and also achieves a targeted distribution of a small remaining amount of sealant to form a thin sealant layer or film between the locking collar and the locking portion of the bolt shaft, as follows. During the joining or securing process, the locking collar is securely deformed in a force-locking manner onto the knurling peaks, but the locking collar preferably and advantageously does not completely penetrate into and fill the bottom of the knurling grooves or the shaft base surface between the knurling peaks. This leaves gap channels at the bottom of the knurling grooves, i.e. free gap channels between the knurling base surface and the locking collar, in which the sealant can uniformly distribute itself. In this manner, the formation of an enclosed or encapsulated, pressurized hydraulic buffer (which would be the case in a continuous circumferential extending annular groove) is avoided during the swaging deformation of the locking collar, because the knurling includes spiral grooves that extend helically in the axial direction so as to interrupt and open-up any isolated grooves such as circumferentially extending grooves.

Instead of a knurling pattern including spiral knurling grooves, it is alternatively possible to provide a knurling pattern formed by the intersection of circumferentially extending grooves and axially extending grooves. With such a knurling pattern, the axially extending grooves provide the venting or sealant-distributing function to prevent the formation of a sealed, encapsulated hydraulic buffer of sealant material enclosed in a continuous circumferentially extending groove. A generalized feature of an embodiment of the invention is thus that the knurling pattern includes grooves that extend in a direction having an axial component, so as to prevent the formation of enclosed cells or hydraulic buffers in which the sealant becomes trapped between the bolt shaft surface and the locking collar.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
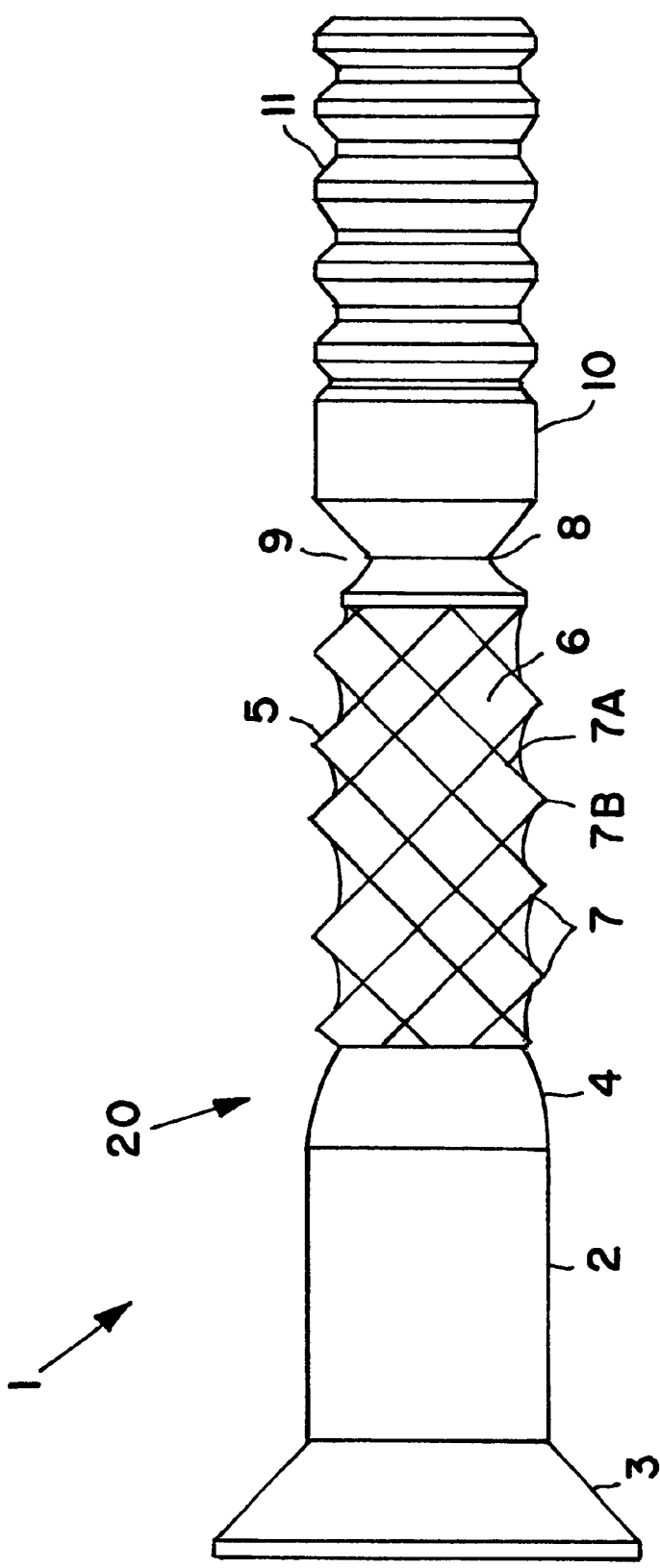
FIG. 1 is a side view of a first embodiment of a lockbolt according to the invention.

As shown in FIG. 1, a lockbolt 1 includes a flat countersunk head 3 mechanically rigidly connected to one end of a generally cylindrical shaft 20. Instead of the countersunk head 3, the lockbolt may have any other conventionally known head configuration, such as a cylindrical head, a pan head, a round head, or the like. Adjoining the bolt head 3, the shaft 20 includes a cylindrical shank 2, which transitions through a preferably conically tapering portion 4 into a profiled or surface-patterned locking portion 5. The surface profiling of this locking portion 5 comprises a knurling 6 therearound, made up of knurling peaks 7B bounded by knurling flanks 7, between respective adjacent knurling grooves 7A. In this embodiment, the knurling peaks 7B are essentially diamond-shaped, i.e. having a pyramid shape with a four-sided diamond-shaped base, and the knurling grooves 7A include two sets of grooves respectively extending in opposite spiral directions helically around the surface of the bolt shaft and intersecting one another.

The locking portion 5 of the bolt shaft 20 is connected through a predetermined breaking point or frangible neck 8 to a break-away portion 10 of the bolt shaft 20 that is adapted to have an installation tool (not shown) engaged thereon. In this embodiment, the predetermined breaking point or frangible neck 8 is formed by a circumferentially extending groove 9. For securely engaging the installation tool onto the break-away portion 10 of the lockbolt 1, at least a part of the break-away portion 10 is provided with grooves 11, particularly such as the illustrated parallel circumferentially extending grooves 11.

Figure 2:
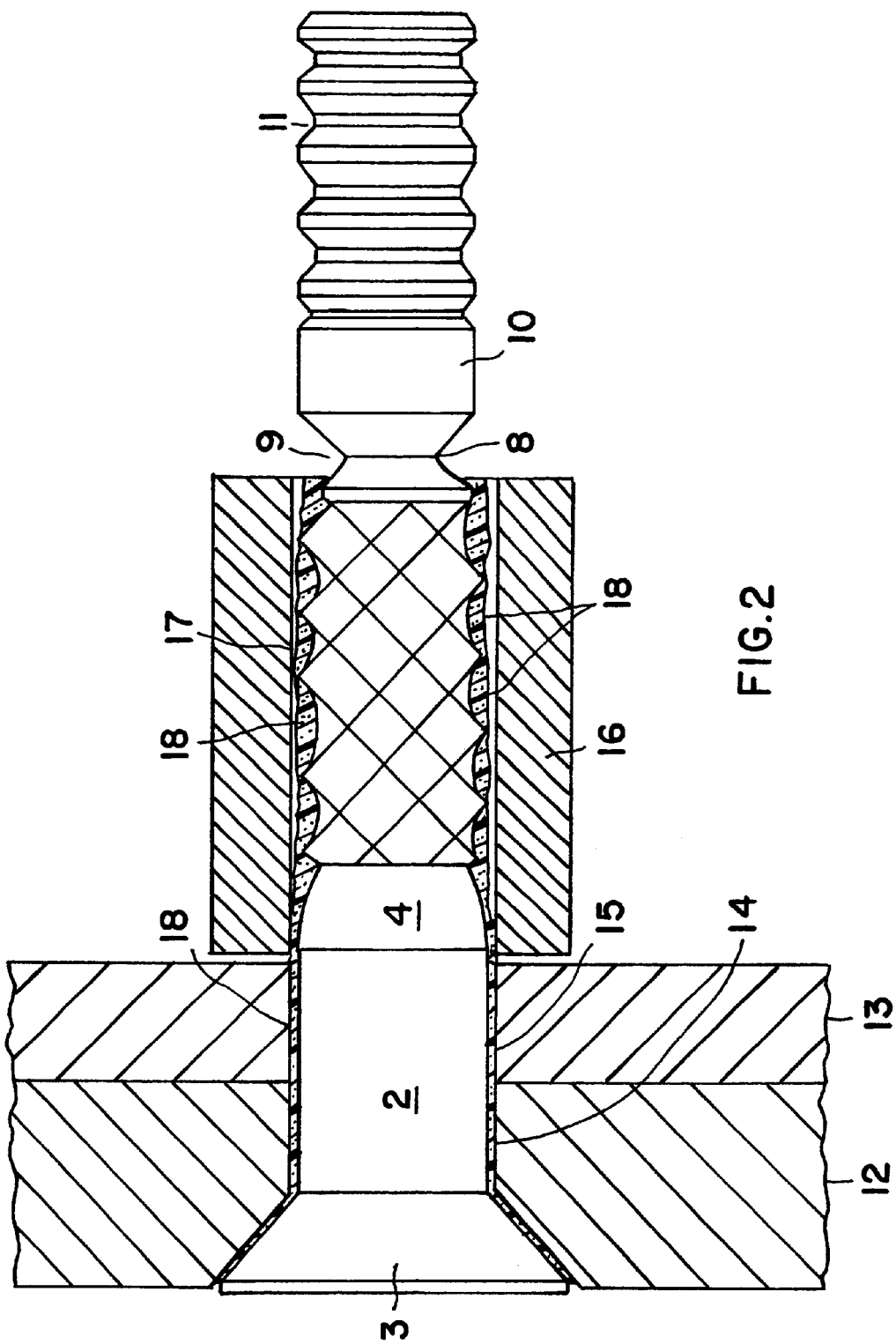
FIG. 2 is a side view of the lockbolt of FIG. 1, installed in two sectionally illustrated plate-shaped workpieces that are to be joined, and a sectionally illustrated locking collar arranged on the bolt, at a stage before the locking or joining process.

FIG. 2 shows the arrangement of the lockbolt 1 during the installation process. The lockbolt 1 will cooperate with a cylindrical (i.e. circumferentially continuous) sleeve-shaped locking collar 16 (which may alternatively have an axially shorter ring configuration) to form a mechanically secure connection of two workpieces 12 and 13 with each other. The joint and the lockbolt will additionally be sealed by a sealant 18. In this example, the workpieces 12 and 13 are substantially plate-shaped workpieces. These two workpieces 12 and 13 are arranged overlapping and surfacially contacting each other with respective individual facing surfaces thereof, and are respectively provided with mutually aligned fitting bore holes 14 and 15, through which the shank 2 of the lockbolt 1 extends.

The hole 14 in the workpiece 12 includes a conically tapered countersink recess, in which the countersunk head 3 of the lockbolt 1 is received with the flat surface of the head 3 flush with the outer surface of the workpiece 12. The conically tapering transition portion 4, the locking portion 5, the predetermined breaking point 8, and the break-away portion 10 of the lockbolt 1 protrude outwardly from the opposite side, i.e. the opposite outer surface of the second workpiece 13. The cylindrical sleeve-shaped locking collar 16 is arranged on the bolt shaft 20 so that the conical tapering transition portion 4 as well as the locking portion 5 of the bolt shaft 20 are received and surrounded rounded in the bore 17 of the locking collar 16.

In order to form a tight seal at the location of this joint, i.e. through the holes 14 and 15 and the arrangement of the locking bolt 1, a sealant 18 is applied between the workpieces 12 and 13, and/or in the holes 14 and 15 of the workpieces 12 and 13, before or together with the insertion of the shaft 20 of the lockbolt 1 into the holes 14 and 15. The sealant 18 may even be applied directly to the locking bolt 1 when it is inserted into the holes 14 and 15. In any event, during this so-called "wet assembly" of the lockbolt 1 into the holes 14 and 15 of the workpieces 12 and 13, contamination in the form of deposits or excess amounts of the sealant 18 will be accumulated on the knurling 6, and particularly in the knurling grooves 7A between the knurling flanks 7. According to the invention, it is not necessary to remove the sealant 18 from this area before arranging the locking collar 16 thereon, but rather the sealant 18 at this location will purposely serve an additional sealing and adhesive function between the lockbolt 1 and the locking collar 16.

Figure 3:
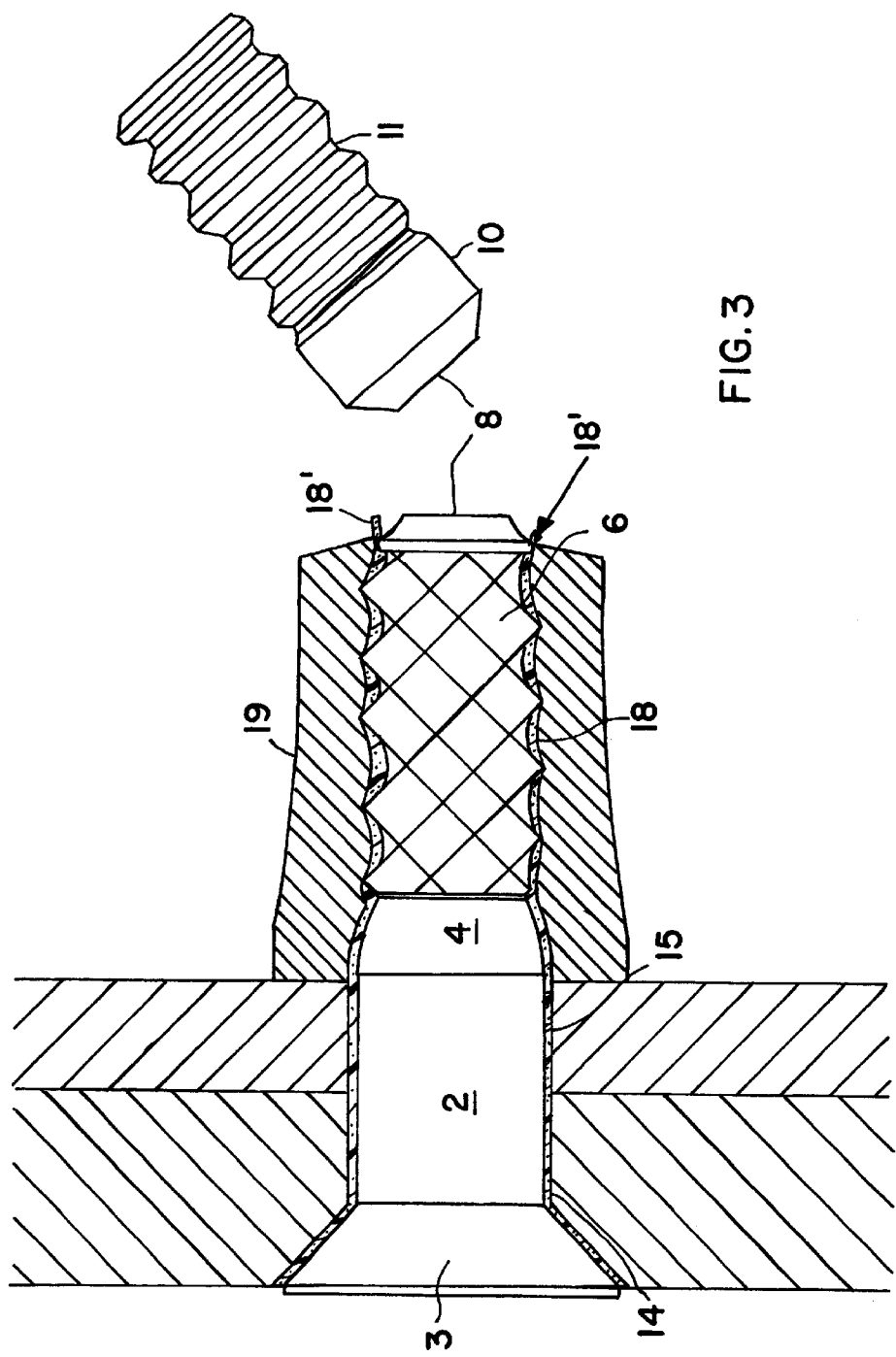
FIG. 3 is a view similar to that of FIG. 2, at a stage after completion of the joining process and separation of the break-away portion of the lockbolt.

FIG. 3 shows the completed, mechanically secured and sealed connection of the two workpieces 12 and 13 after completion of the bolt setting and joining process. An installation tool (which is not shown) has been set and engaged onto the break-away portion 10 and exerted a compression load onto the locking collar 16, such that the locking collar 16 has been swaged into a deformed condition 19 in such a manner so that it is engaged and locked in a force-locking manner onto the locking portion 5 of the lockbolt 1. While the locking collar 16 is being deformed into the deformed condition 19, simultaneously, the sealant 18 present within the bore 17 of the locking collar 16, 19 is being squeezed and spread-out along the knurling 6, and especially so as to form a thin surfacially extending sealant layer or film along the knurling flanks 7. The sealant 18 does not become trapped or encapsulated between the locking collar 16, 19 and the locking portion 5, because the knurling 6 (and especially the knurling grooves 7A) allow the sealant 18 to be spread out in the axial direction. Any excess amount of sealant 18 is squeezed-out or exuded as shown by reference number 18' at the open axial end of the locking collar 16, 19, which communicates with the atmosphere around the lockbolt. In this manner, the resulting thin uniform layer of sealant 18 does not hinder the mechanical swaging of the locking collar 16, 19 onto the knurling 6, but instead actually provides an additional adhesive bonding and sealing function therebetween. Thus, as also shown in FIGS. 1 to 3, the bolt shaft 20 is not provided with a screw threading, and the locking collar 16, 19 is not screwed but rather is swaged onto the knurled locking portion 5 of the bolt shaft 20.

As further indicated in FIG. 3, at the end of the joining process, the assembly tool is used to separate the break-away portion 10 from the locking portion 5 of the lockbolt 1 at the frangible neck or breaking point 8. For example, the tool engages the grooves 11, and is then used to deflect and/or twist and/or pull the break-away portion 10 until it is simply broken off at the breaking point 8.

Figure 4:
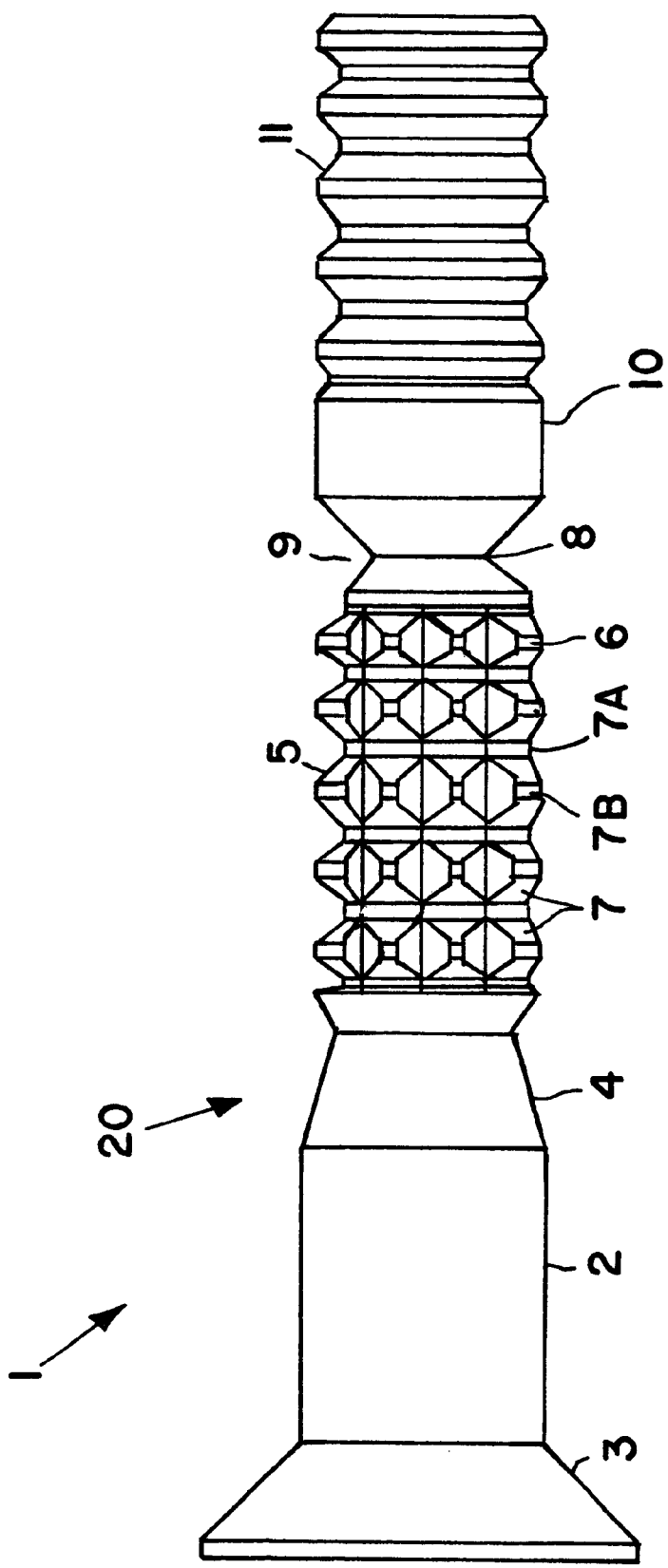
FIG. 4 is a side view of a second embodiment of a lockbolt according to the invention.

FIG. 4 shows a second example embodiment of a lockbolt 1 that is generally similar to that of FIG. 1, except that the knurling 6 has a different configuration. In this embodiment of FIG. 4, the knurling 6 includes square or rectangular knurling peaks 7B formed between a first set of circumferential knurling grooves 7A and a second set of axial knurling grooves 7A. The two sets of grooves intersect each other. Thereby, the axially extending grooves 7A provide for the escape or squeezing-out and distributing of the sealant 18 in the manner as described above in connection with FIG. 3. Thus, once again in the embodiment of FIG. 4, the sealant 18 will form a distributed thin sealant layer between the deformed locking collar and the knurling, which does not hinder the swaging engagement therebetween, but rather provides an additional adhesive bonding and sealing function therebetween. In this context, a "thin" layer is one that is sufficiently thin so that it does not hinder the mechanical swaging engagement of the collar onto the locking portion.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A lockbolt arrangement comprising a lockbolt, a locking collar, and a sealant, wherein:

said lockbolt includes a bolt shaft extending axially in an axial direction and a bolt head on a first end of said bolt shaft;

said bolt shaft includes a locking portion that has a knurled surface including knurling peaks having knurling flanks defined respectively between knurling grooves;

said locking collar is arranged circumferentially around and deformed into mechanical engagement on said locking portion;

said sealant is disposed in a distributed manner at least in said knurling grooves and as a thin surfacially extending layer of said sealant on at least said knurling flanks between said knurled surface and said locking collar; and said sealant does not hinder said mechanical engagement of said locking collar onto said locking portion, and said sealant additionally provides a seal and an adhesive bond between said locking collar and said locking portion.

2. The lockbolt arrangement according to claim 1, wherein said knurling grooves intersect with one another and at least some of said knurling grooves extend to respective open groove ends at an axial end of said locking portion so as to communicate with the atmosphere surrounding said lockbolt arrangement, so that said sealant does not become encapsulated and pressurized between said knurled surface and said locking collar, and so that an excess amount of said sealant is squeezed out from said open groove ends.

3. The lockbolt arrangement according to claim 1, further comprising two workpieces that each have a respective hole therein, wherein said bolt shaft further includes a shank between said bolt head and said locking portion, said workpieces are overlapped on one another with said holes thereof axially aligned with one another, said shank extends through said holes, and said workpieces are securely held between said bolt head and said locking collar.

4. The lockbolt arrangement according to claim 1, wherein said bolt shaft further includes a shank connected to said bolt head, and extending between said bolt head and said locking portion, and a break-away portion connected to said locking portion through a predetermined breaking portion.

5. The lockbolt arrangement according to claim 4, wherein said predetermined breaking portion comprises a constricted frangible neck encircled by a circumferential continuous groove.

6. The lockbolt arrangement according to claim 4, wherein said break-away portion has thereon a plurality of mutually parallel circumferential grooves adapted to have a tool engaged therewith.

7. The lockbolt arrangement according to claim 1, wherein respective ones of said knurling grooves intersect with one another in such a knurling pattern so that each one of said knurling peaks has a respective diamond parallelogram plan shape.

8. The lockbolt arrangement according to claim 1, wherein respective ones of said knurling grooves intersect with one another in such a knurling pattern so that each one of said knurling peaks has a respective square or rectangular plan shape.

9. The lockbolt arrangement according to claim 1, wherein each one of said knurling peaks has a pyramid shape with a four-sided base.

10. The lockbolt arrangement according to claim 1, wherein at least some of said knurling grooves extend in a direction having a component parallel to said axial direction.

11. The lockbolt arrangement according to claim 1, wherein said knurling grooves comprise spiral grooves extending respectively along a helical spiral.

12. The lockbolt arrangement according to claim 11, wherein said spiral grooves include a first group of spiral grooves that respectively extend in a clockwise spiral direction and a second group of spiral grooves that respectively extend in a counterclockwise spiral direction and intersect with said first group of spiral grooves.

13. The lockbolt arrangement according to claim 1, wherein said knurling grooves include a first group of grooves that respectively extend in a circumferential direction and a second group of grooves that respectively extend parallel to said axial direction and intersect with said first group of grooves.

14. The lockbolt arrangement according to claim 1, wherein respective ones of said knurling grooves intersect with one another so that all of said knurling grooves are thereby interconnected and intercommunicated with each other, and wherein at least one of said knurling grooves extends to and opens at an open groove end at an axial end of said locking portion along said axial direction.

15. The lockbolt arrangement according to claim 1, wherein said locking portion excludes all annular circumferential grooves.

16. The lockbolt arrangement according to claim 1, wherein said bolt shaft is not provided with a screw threading, and said locking collar is not screwed onto said locking portion.

17. The lockbolt arrangement according to claim 1, wherein said locking collar is a one-piece integral circumferentially-continuous sleeve that is arranged directly on said locking portion.

18. A lockbolt arrangement comprising a lockbolt, a locking collar, and a sealant, wherein:

said lockbolt includes a bolt shaft extending axially in an axial direction and a bolt head on a first end of said bolt shaft;

said bolt shaft includes a locking portion that has a knurled surface including knurling peaks having knurling flanks defined respectively between knurling grooves;

said locking collar is arranged circumferentially around and deformed into mechanical engagement on said locking portion;

said sealant is disposed in a distributed manner at least in said knurling grooves between said knurled surface and said locking collar;

said knurling grooves comprise spiral grooves extending respectively along a helical spiral;

said spiral grooves include a first group of spiral grooves that respectively extend in a clockwise spiral direction and a second group of spiral grooves that respectively extend in a counterclockwise spiral direction and intersect with said first group of spiral grooves; and said first group and said second group of said spiral grooves intersect each other to form a knurling pattern wherein each one of said knurling peaks has a respective square or rectangular plan shape.

19. The lockbolt arrangement according to claim 18, wherein said locking portion excludes all annular circumferential grooves.

20. A lockbolt arrangement comprising a lockbolt, a locking collar, and a sealant, wherein:

said lockbolt includes a bolt shaft extending axially in an axial direction and a bolt head on a first end of said bolt shaft;

said bolt shaft includes a locking portion that has a knurled surface including knurling peaks having knurling flanks defined respectively between knurling grooves;

said locking collar is arranged circumferentially around and deformed into mechanical engagement on said locking portion;

said sealant is disposed in a distributed manner at least in said knurling grooves between said knurled surface and said locking collar; and said knurling grooves include a first group of grooves that respectively extend in a circumferential direction respectively on planes perpendicular to said axial direction and a second group of grooves that respectively extend parallel to said axial direction and intersect with said first group of grooves.

* * * * *